US011976675B2

(12) United States Patent
Eckhardt et al.

(10) Patent No.: US 11,976,675 B2
(45) Date of Patent: May 7, 2024

(54) SYSTEMS AND METHODS FOR BLEED DOWN AND RETRACTION OF A CONSTRUCTION MACHINE BOOM

(71) Applicant: Xtreme Manufacturing, LLC, Henderson, NV (US)

(72) Inventors: Jeffrey Lee Eckhardt, Las Vegas, NV (US); Ryan Paul Sobotka, Eureka, MO (US)

(73) Assignee: Xtreme Manufacturing, LLC, Henderson, NV (US)

( * ) Notice: Subject to any disclaimer, the term of this patent is extended or adjusted under 35 U.S.C. 154(b) by 578 days.

(21) Appl. No.: 17/173,793

(22) Filed: Feb. 11, 2021

(65) Prior Publication Data

US 2022/0252086 A1 Aug. 11, 2022

(51) Int. Cl.

*F15B 13/10* (2006.01)
*B66F 11/04* (2006.01)
*B66F 13/00* (2006.01)
*F15B 15/20* (2006.01)

(52) U.S. Cl.

CPC ............ *F15B 13/10* (2013.01); *B66F 11/046* (2013.01); *B66F 13/00* (2013.01); *F15B 15/20* (2013.01)

(58) Field of Classification Search

CPC ........ B66F 11/046; B66F 9/22; B66F 9/0655; F15B 20/002; F15B 2211/862; F15B 2211/863; F15B 2211/8752; E02F 9/226

See application file for complete search history.

(56) References Cited

U.S. PATENT DOCUMENTS

| | | | | |
|---|---|---|---|---|
| 4,687,406 | A * | 8/1987 | Kinsey | B66F 11/046 414/718 |
| 4,694,930 | A * | 9/1987 | Kishi | B66F 11/046 182/2.11 |
| 5,271,707 | A | 12/1993 | Derksen et al. | |
| 5,413,402 | A | 5/1995 | Flerchinger et al. | |
| 6,182,798 | B1 | 2/2001 | Brady et al. | |

(Continued)

FOREIGN PATENT DOCUMENTS

| | | |
|---|---|---|
| CA | 1317867 C | 5/1993 |
| CN | 102583184 A | 7/2012 |

(Continued)

OTHER PUBLICATIONS

Extended European Search Report for Patent Application EP 21211019.1 dated Jun. 1, 2022; 15 pp.

*Primary Examiner* — Thomas E Lazo
(74) *Attorney, Agent, or Firm* — Armstrong Teasdale LLP

(57) ABSTRACT

A hydraulic system for controlling bleed down and retraction of a boom within a safety envelope includes a backup battery power supply, and at least a first boom lift hydraulic cylinder configured to raise and lower the boom. The first boom lift hydraulic cylinder includes a solenoid bleed valve electrically connected to the backup battery power supply. The hydraulic system also includes an input device controllable by an operator of the boom. The input device may, for instance, be used by the operator to initiate bleed down and retraction of the boom from an elevated position. To accommodate independent failsafe features of the system, the input device is configured to selectively actuate the solenoid bleed valve using electrical power supplied from the backup battery power supply.

18 Claims, 7 Drawing Sheets

(56) References Cited

U.S. PATENT DOCUMENTS

| | | | | |
|---|---|---|---|---|
| 7,104,181 | B2 * | 9/2006 | Bitter | F15B 11/024<br>91/437 |
| 2003/0173151 | A1 * | 9/2003 | Bodtke | B66F 17/006<br>182/2.11 |
| 2012/0201639 | A1 * | 8/2012 | Turrini | B66F 9/0655<br>414/634 |
| 2020/0309166 | A1 * | 10/2020 | Kawabuchi | F15B 20/002 |

FOREIGN PATENT DOCUMENTS

| | | | | | |
|---|---|---|---|---|---|
| CN | 202440264 | U | | 9/2012 | |
| CN | 205187797 | U | | 4/2016 | |
| CN | 106829815 | A | * | 6/2017 | B66F 11/046 |
| CN | 106829815 | A | | 6/2017 | |
| CN | 107720642 | A | | 2/2018 | |
| CN | 109372811 | A | | 2/2019 | |
| CN | 209143622 | U | | 7/2019 | |
| CN | 209536846 | U | | 10/2019 | |
| CN | 210461213 | U | | 5/2020 | |
| CN | 111404261 | A | | 7/2020 | |
| DE | 2909052 | A1 | | 9/1980 | |
| DE | 19818486 | A1 | | 1/1999 | |
| IT | UB20160056 | A1 | | 7/2017 | |
| JP | 11292496 | A | * | 10/1999 | |
| JP | H11292496 | A | | 10/1999 | |

* cited by examiner

SYSTEMS AND METHODS FOR BLEED DOWN AND RETRACTION OF A CONSTRUCTION MACHINE BOOM

BACKGROUND

The field of the disclosure relates generally to construction equipment, and more particularly to systems and methods for use in controlling bleed down and retraction of a boom of a construction machine, such as when primary power is lost or otherwise unavailable.

A variety of known construction vehicles, such as boom lifts and cranes, for example, may be used to move a payload between the ground and an elevated position, between ground-level positions, and/or between elevated positions. Such vehicles often include a telescoping boom, on the end of which may be coupled an implement, such as a pair of forks or a work platform, for example. Conventionally, such vehicles include a rear end, a front end, and a body extending therebetween, and the boom of such vehicles generally pivots about a horizontal axis located near the rear end of the vehicle. In some cases, the boom may also be configured to articulate at one or more pivot points or joints defined near a proximal end of the boom and/or a distal end of the boom.

Many of such known vehicles are designed with a variety of failsafe modes. For example, at least some known construction vehicles may include one or more operational modes used for lowering a boom under certain emergency conditions. These operational modes can be particularly useful during operational time periods when an operator of the construction vehicle is suspended from the vehicle at the end of the boom, which as described herein, may include a work platform capable of supporting the operator. Under certain operating conditions, vehicle failures may occur, and conventional failsafe modes may be activated to enable the boom operator suspended in the boom to be lowered safely in the work platform from a raised position.

Although conventional construction vehicles may include failsafe modes, at least one shortcoming common to many known construction vehicles is that no operating provisions exist to ensure that the boom remains within a predefined stable range of motion (sometimes referred to as a "safety envelope") as it is lowered to enable the operator to be safely rescued from the work platform at the end of a raised and/or extended boom position.

Such shortcomings can be exasperated under certain physical circumstances, such as, for example, when the boom is not only raised, but when it is also extended or telescoped. Under such operating cases, as the boom is lowered, the length of the telescoped boom can create a substantial moment, or torque, produced about the body of the construction vehicle. Depending on the length of the telescoped boom, the moment or torque can destabilize the center of gravity of the vehicle. It can thus be seen that at least some known failsafe modes may result in a boom position that is substantially outside a safety operational envelope of the construction vehicle. When such operational conditions occur, the construction vehicle may be prone to tipping or other unstable operating conditions, which may jeopardize the safety of the construction vehicle operator in the work platform.

In addition, many known construction vehicles also rely upon existing machine systems and subsystems, such as existing hydraulic and electrical systems, for the implementation of desired failsafe modes. For example, many known construction vehicles may include counterbalanced relief valves, which may be actuated to relieve a hydraulic pressure on the system. However, such valves may be physically located at ground level and thus may be inaccessible by an operator of the vehicle suspended at the end of the boom. As a result, if the operator is not accompanied by another individual that remains on the ground, known systems may not be used when an operator suspended in a boom becomes stranded, such as by electrical failure or a hydraulic leak, well-above ground level. Furthermore, because the failsafe modes of many conventional systems rely upon existing hydraulic and electrical systems, damage to such systems can result in impairment or loss of the failsafe modes themselves.

Accordingly, systems and methods for lowering and retraction of a construction machine boom are desirable. For example, systems capable of maintaining a boom within a safety envelope as the boom is lowered from a raised position and/or retracted from an extended position are desirable. In addition, systems capable of actuation by an operator working alone are desirable, and more particularly, systems capable of actuation by a solo operator, even in circumstances that the operator is stranded at the end of a raised and/or telescoped boom are desirable. Moreover, more robust systems for accomplishing these and other objectives are also desirable, such as systems that are capable of withstanding damage to the hydraulic and electrical systems of the construction machine and that are not impaired or altogether disabled by damage to the construction machine are desirable.

This section of the application, i.e., the Background Section, is intended to introduce the reader to various aspects of art that may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION

In one example, a hydraulic system for controlling retraction of a boom within a pre-defined safety envelope is provided. The system includes a backup battery power supply, and at least a first boom lift hydraulic cylinder configured to raise and lower the boom. In the exemplary embodiment, the first boom lift hydraulic cylinder includes a solenoid bleed valve electrically connected to the backup battery power supply. The hydraulic system also includes an input device controllable by an operator of the boom. The input device may, for instance, be used by the operator to initiate bleed down and retraction of the boom, such as from an elevated position on a work platform of the boom. Further, to accommodate failsafe features of the system, the input device is configured to selectively actuate the solenoid bleed valve using electrical power supplied from the backup battery power supply.

In another example, a construction machine is provided. The construction machine includes a boom, and a hydraulic system for controlling bleed down and retraction of the boom. In part, the hydraulic system includes at least a first boom lift actuator configured to raise and lower the boom. In the exemplary embodiment, the first boom lift actuator includes a first bleed valve. The hydraulic system also includes at least a first boom extend actuator configured to extend and retract the boom. In turn, the first boom extend actuator includes an inflow valve in fluid communication with the bleed valve. In operation, the first boom extend actuator is configured to receive a first flow of fluid from first boom lift actuator in response to opening of the bleed valve, wherein when the first flow of fluid is received by the first boom extend actuator, the second boom extend actuator retracts the boom.

In yet another example, a method for controlling bleed down and retraction of a boom within a safety envelope is provided. The method may include receiving a first flow of fluid within a flow manifold from a first actuator, where the first actuator is configured to raise and lower the boom, and where the first flow of fluid is received in response to lowering of the boom. The method may also include receiving a second flow of fluid within the flow manifold from a second actuator, where the second actuator is configured to raise and lower the boom, and where the second flow of fluid received in response to lowering of the boom. In addition, the method may include combining the first flow of fluid and the second flow of fluid into a combined flow of fluid, and selectively providing the combined flow of fluid to a third actuator. The third actuator may be configured to extend and retract the boom, wherein when the combined flow of fluid is provided to the third actuator, the third actuator retracts the boom within a safety envelope while the boom is being lowered.

DETAILED DESCRIPTION

Figure 1:
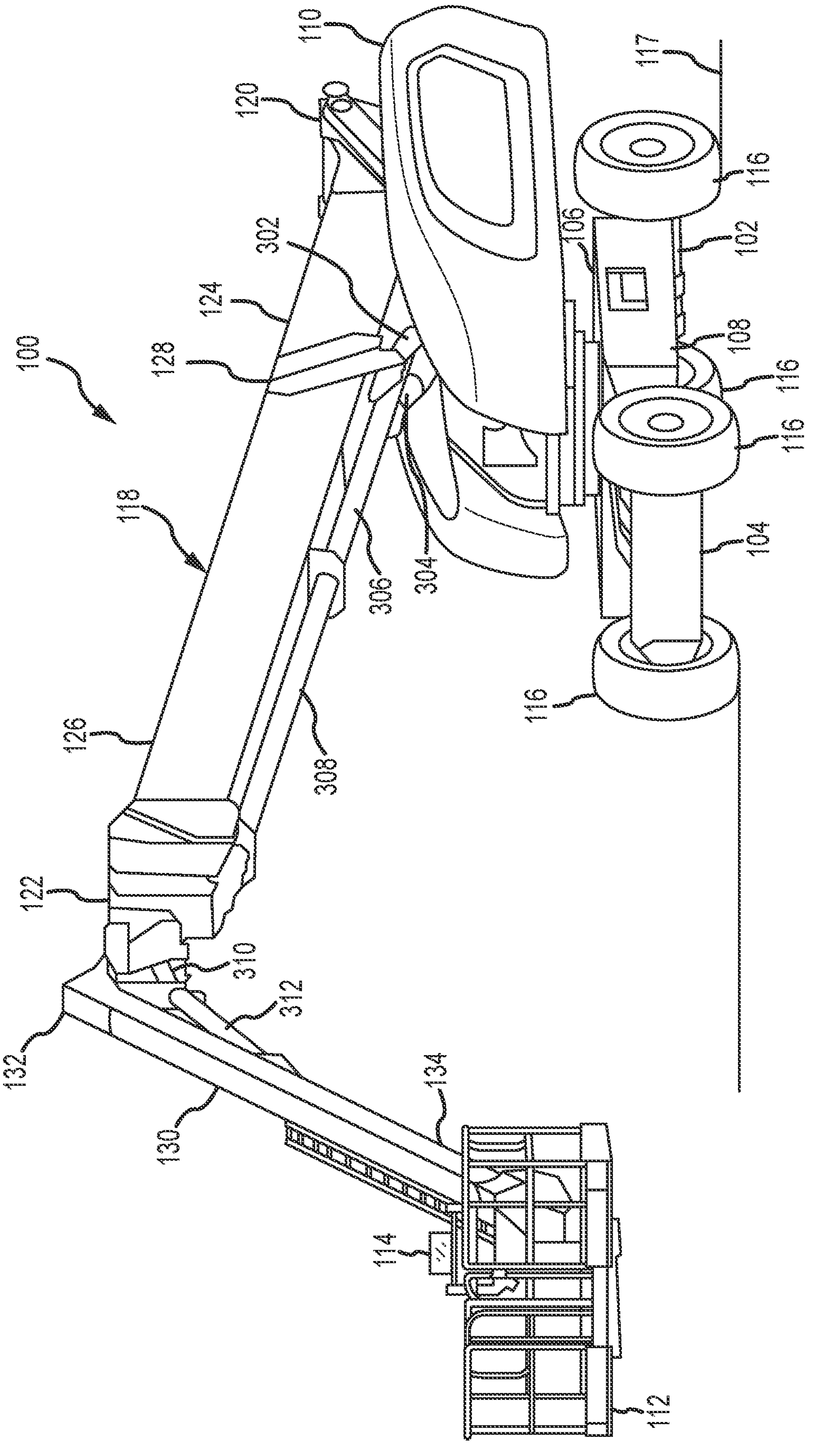
FIG. 1 is a perspective view of an exemplary construction machine, such as an aerial work vehicle, in which a boom of the construction machine is lowered.

Systems and methods that control the bleed down and/or retraction of a construction machine boom are described herein. In the exemplary embodiment, a system is provided that includes a backup battery power supply, one or more hydraulic actuators used to selectively raise, lower, extend, and/or retract the boom, and an input device that is controllable by an operator of the boom. The backup battery power supply enables the operator to control bleed down and/or retraction of the boom when primary electrical power is interrupted. Further, the input device may be positioned in a location that is accessible by the operator when the boom is raised and/or extended, such as coupled to a work platform extending from a distal end of the boom.

In addition, in at least some embodiments, an additional input device may be positioned near ground level to enable an individual located at ground level to initiate and/or control bleed down and retraction of the boom, as described herein. Thus, in various embodiments, an operator stranded in a work platform may initiate bleed down and retraction of a boom. Likewise, an operator or another individual located substantially at ground level may also initiate and/or control bleed down and retraction of the boom.

Thus, in at least some embodiments, the system described herein advantageously receives control instruction(s) from the operator of the boom that cause the boom to initiate a bleed down sequence, even when the operator is located relatively high above the construction machine at the end of a raised and extended boom. Further, the system can function as a failsafe system for the construction machine, and thus may be provided alongside of, and independently of, one or more conventional control systems, and which can operate even when primary power is interrupted or otherwise lost.

In addition to these features, the system described herein is capable of maintaining the boom within a predefined safety envelope (e.g., a pre-defined stable operating range of motion or predefined stable operating ranges of boom lengths and extension positions) during bleed down and retraction of the boom. To achieve these advantages, the system described herein channels fluid flow from one or more boom lift actuators, used to selectively control boom height, to a fluid manifold that combines these flows and redistributes the combined flow to one or more boom extend actuators, used to selectively control boom extension and retraction. Thus, during operation, the system is able to simultaneously control bleed down and retraction operations, as hydraulic fluid is released from the boom lift actuators, thus enabling the actuators to lower the boom. Moreover, as the fluid is channeled into a piston rod side of the one or more of the boom extend actuators, retraction of the boom lift actuators and, correspondingly, the boom itself occurs.

Technical effects and improvements thus include, but are not limited to only the following: (i) providing a construction machine, such as an aerial work vehicle (e.g., a telehandler, a crane, or a construction boom) capable of maintaining a boom within a safety envelope as the boom is selectively lowered from a raised position, and/or is retracted from an extended position; (ii) facilitating emergency bleed down, or lowering, of a construction machine boom substantially in tandem with retraction of the boom, such that the boom is maintained within the predefined safety envelop, (iii) providing hydraulic systems capable of transferring hydraulic fluid between various boom lift actuators and boom extend actuators to enable and to facilitate the emergency bleed down and retraction of the boom; (iv) providing an emergency bleed down and/or boom retraction system capable of actuation by an operator working alone, even during circumstances that the operator is stranded at the end of a raised and/or telescoped boom; and/or (v) providing robust systems capable of withstanding damage to the basic hydraulic and electrical systems of the construction machine, such as emergency systems capable of operation on backup battery power, solar power, and the like.

In the following specification and the claims, reference will be made to a number of terms, which may be used in conjunction with the following meanings.

The singular forms “a”, “an”, and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, values modified by a term or terms, such as “about” and “substantially”, are not to be limited to the precise values specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Likewise, as used herein, spatially relative terms, such as “beneath,” “below,” “under,” “lower,” “higher,” “above,” “over,” and the like, may be used to describe one element or feature’s relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being “below” one or more other elements or features may be regarded as being “above” those elements or features. Thus, exemplary terms such as “below,” “under,” or “beneath” may encompass both an orientation of above and below, depending, for example, upon a relative orientation between such elements or features and one or more other elements or features.

In addition, as used herein, the terms “bleed down” and “emergency bleed down” may be used to refer to any process or procedure used for lowering or otherwise controlling a motion of a construction machine boom to cause the boom to move from a raised position to a lowered position. It should be noted that the lowered position resulting from bleed down need not be the lowest position that the boom is capable of moving to, but rather, intermediate boom positions between a fully extended or raised boom position to a fully lowered or retracted position are contemplated. As described in additional detail herein, bleed down, or lowering of the boom, may be also performed in conjunction with retraction of the boom from a telescoped or extended position. In some cases, during bleed down, a boom may be fully retracted. However, in other instances, a retracted position achieved during bleed down need not be a fully retracted position, but may also include any intermediate retracted position.

Also, as used herein, the terms “working envelope” and “safety envelope” may be used to refer to a predefined stable range of operating motion associated with a construction machine. For example, a safety envelope may include all predefined stable combinations of height and outreach of a construction machine, such as all predefined stable operating combinations of telescoped boom length and boom height. Such combinations may directly influence the stability and strength requirements of the construction machine, and may also affect the height, angle, and outreach combination limits that are permissible for different types, models, and sizes of construction machines. By limiting the operation of the construction machine to those heights, angles, and outreach that are within the predefined operating or working envelope, safe operation can reasonably expected.

Accordingly, a predefined safety envelope may include those combinations of boom length and boom height that are within design limits or, in other terms, those combinations that have been determined to fall within an acceptable range of operating stability. In some cases, a processor of the construction machine may receive sensor measurements of boom length and boom elevation or boom angle to determine whether the combination of parameters falls within a predefined safety envelope. In other circumstances, as described herein, a flow manifold may divert and combine flows, such as during a bleed down sequence, to facilitate maintaining the boom within range of operating parameters defined by the safety envelope.

Figure 2:
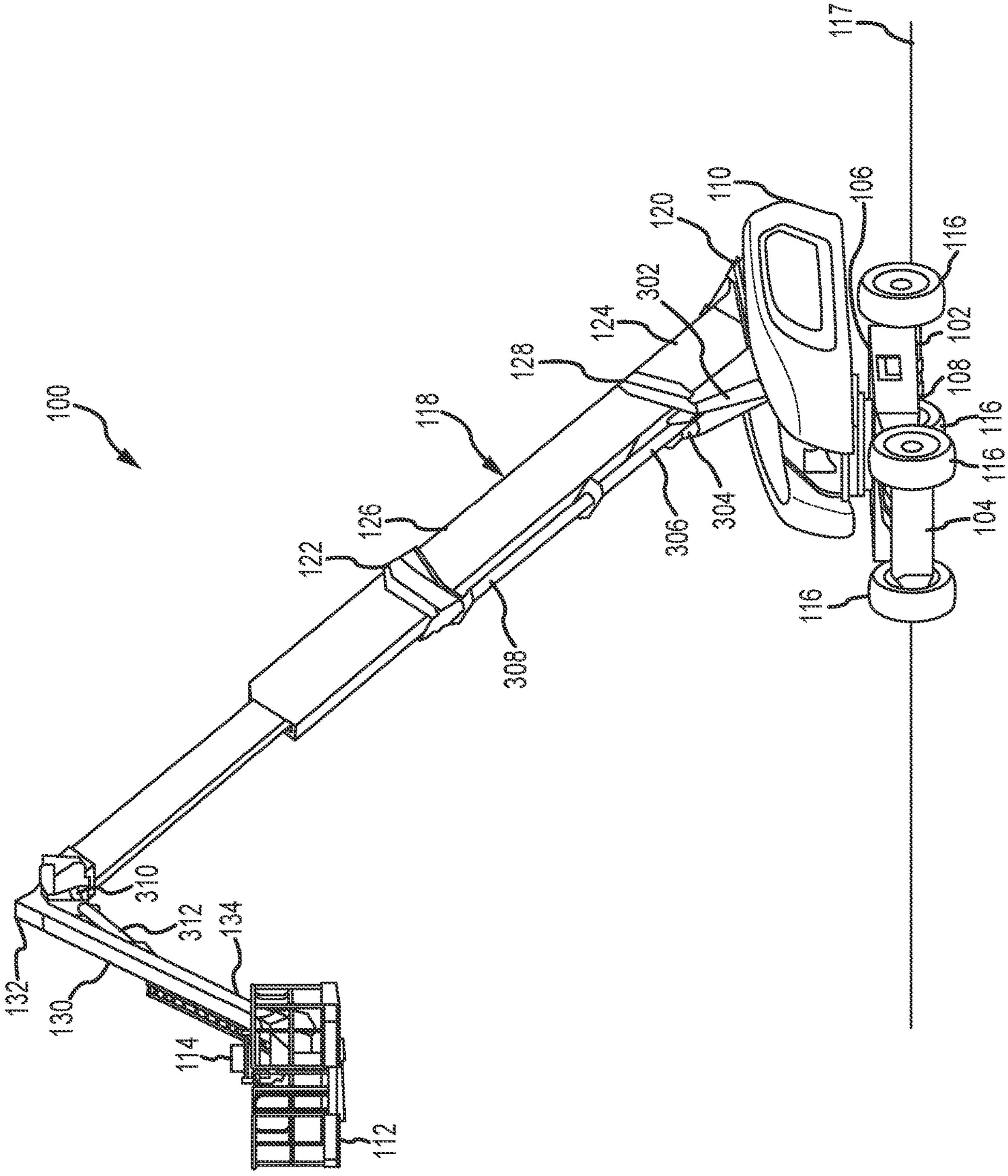
FIG. 2 is a perspective view of the construction machine shown in FIG. 1, in which the boom of the construction machine is raised.

FIG. 1 is a perspective view of an exemplary construction machine 100, such as any of a variety of aerial work vehicles (AWVs), including, but not limited to, construction machines, such as boom lifts, construction cranes, telehandlers, and the like. In FIG. 1, construction machine 100 is shown in a fully retracted and lowered position. FIG. 2 is a perspective view of construction machine 100, with construction machine 100 being in a fully extended and raised position. It will be appreciated that the systems and methods described herein may be used in association with any of a variety of other machines, including any construction machine that includes a boom, such as any telehandler, as well as more generally in association with any other type of AWV.

Accordingly, with general reference to FIGS. 1 and 2, in the exemplary embodiment, construction machine 100 includes a chassis 102 including a forward end 104, an aft end 106 that is opposite forward end 104, and a body 108 extending between ends 104 and 106. In the exemplary embodiment, a rotary table 110 is rotatably coupled to chassis 102. In addition, in many implementations, construction machine 100 includes an operator cab or platform 112 including at least one input device 114, such as at least one control panel, at least one joystick, and the like. In at least some embodiments, construction machine 100 may also include an additional operator cab (not shown) on or near chassis 102, which may also include an input device, such as a joystick and/or control panel (not shown). In some embodiments, input device 114 may not be on platform 112, but rather device 114 may be located near chassis 102. In some embodiments, rotary table 110 can be selectively controlled by an operator using input device 114 and is capable of 360° motion.

In some embodiments, construction machine 100 may also include a plurality of wheels 116, such as powered drive wheels. In some b that may each be powered by individual propulsion motors to enable a variety of travel operations to be performed unique to machines of this type, such as motion involving unique angles, crabbing, and/or other precise motion control adjustments. Wheels 116 generally contact a reference surface 117, such as the ground.

In the exemplary embodiment, construction machine 100 also includes a boom 118 that pivotally extends from chassis 102. In various embodiments, boom 118 may be non-articulating (e.g., a “beam boom”) or may be an articulated boom that includes at least one pivot joint (not shown) and that is capable of articulating motion. In addition, in the exemplary embodiment, boom 118 includes a proximal end 120 and a distal end 122, and boom 118 is pivotally coupled to rotary table 110 of chassis 102 at or near proximal end 120. Further in some embodiments (e.g., if rotary table 110 is excluded), boom 118 may be pivotably coupled to another portion of chassis 102.

In the exemplary embodiment, boom 118 is a telescoping boom that includes at least a first boom section 124 and second boom section 126 coupled together at a slidable joint 128. Boom 118 may also include a jib 130 having a proximal end 132 and a distal end 134. In the exemplary embodiment, proximal end 132 of jib 130 is pivotally coupled to distal end 122 of boom 118. Jib 130, in the exemplary embodiment, also includes work platform 112 (as shown). Alternatively, jib 130 may include material handling implement (e.g., one or more forks) that extends from distal end 134 thereof. Jib 130 permits boom 118 to extend over, for example, obstacles, such as walls and/or heating and ventilating equipment on a roof.

In at least some embodiments, construction machine 100 may also include one or more sensor devices 138-144 (shown in FIG. 5), which are internal to construction machine 100, and thus not shown in FIG. 1. Sensor devices 138-144 may sense one or more positions and/or orientations of construction machine 100. More particularly, in at least some exemplary embodiments, construction machine 100 may include a first sensor device 138, such as a linear sensor, which may determine an extension position of boom 118 (or "boom extension position").

As used herein, a boom extension position may include a length of boom 118 and/or other information about an extension position of boom 118, which may be capable of telescoping between a range of extension positions or lengths. For instance, FIG. 1 shows boom 118 in a first, non-extended position, and FIG. 2 shows boom 118 in a fully extended or fully telescoped extension position. However, boom 118 may telescope to achieve an extension position, or length, along a substantially continuous range between either of these non-extended and fully-extended extension positions. In some embodiments, a plurality of linear sensor devices can be used to determine a boom extension position.

Construction machine 100 may, in addition, include a second sensor device 140, such as an angle sensor, which may determine a boom angle position and/or elevation of boom 118. In some implementations, second sensor device 140 may determine an angle of boom 118 relative to reference surface 117. Likewise, in at least some implementations, second sensor device 140 may determine a boom angle position of boom 118 relative to another reference plane and/or relative to a portion of construction machine 100, such as chassis 102 and/or rotary table 110. Accordingly, as used herein, a boom angle position may include an angle of boom 118 relative to a reference plane, such as reference surface 117 and/or relative to another portion of construction machine 100, including, but not limited to chassis 102 and/or rotary table 110. Likewise, a boom angle position may include a boom elevation and/or processor 302, as described herein, may determine elevation of boom 118 from a variety of sensor data, such as boom length and boom angle position. In some embodiments, a plurality of angle sensor devices may be incorporated.

Construction machine 100 may also include a third sensor device 142, such as a tilt sensor, which may determine a chassis angle position of construction machine 100. As used herein, a chassis angle position may include an inclination or angle of a portion of construction machine 100, such as chassis 102, relative to reference surface 107 and/or another suitable reference plane. Third sensor device 142 may therefore measure or determine an inclination or angle of chassis 102, or another portion of construction machine 100, relative to reference surface 107. In some embodiments, a plurality of tilt sensor devices may be incorporated.

Additionally, in at least some embodiments, construction machine 100 may include a fourth sensor device 144 that determines or measure a position of rotary table 110. The position of rotary table 110 may indicate a relative orientation of boom 118 within a three-hundred-and-sixty degree range of motion permitted by rotary table 110.

Figure 3:
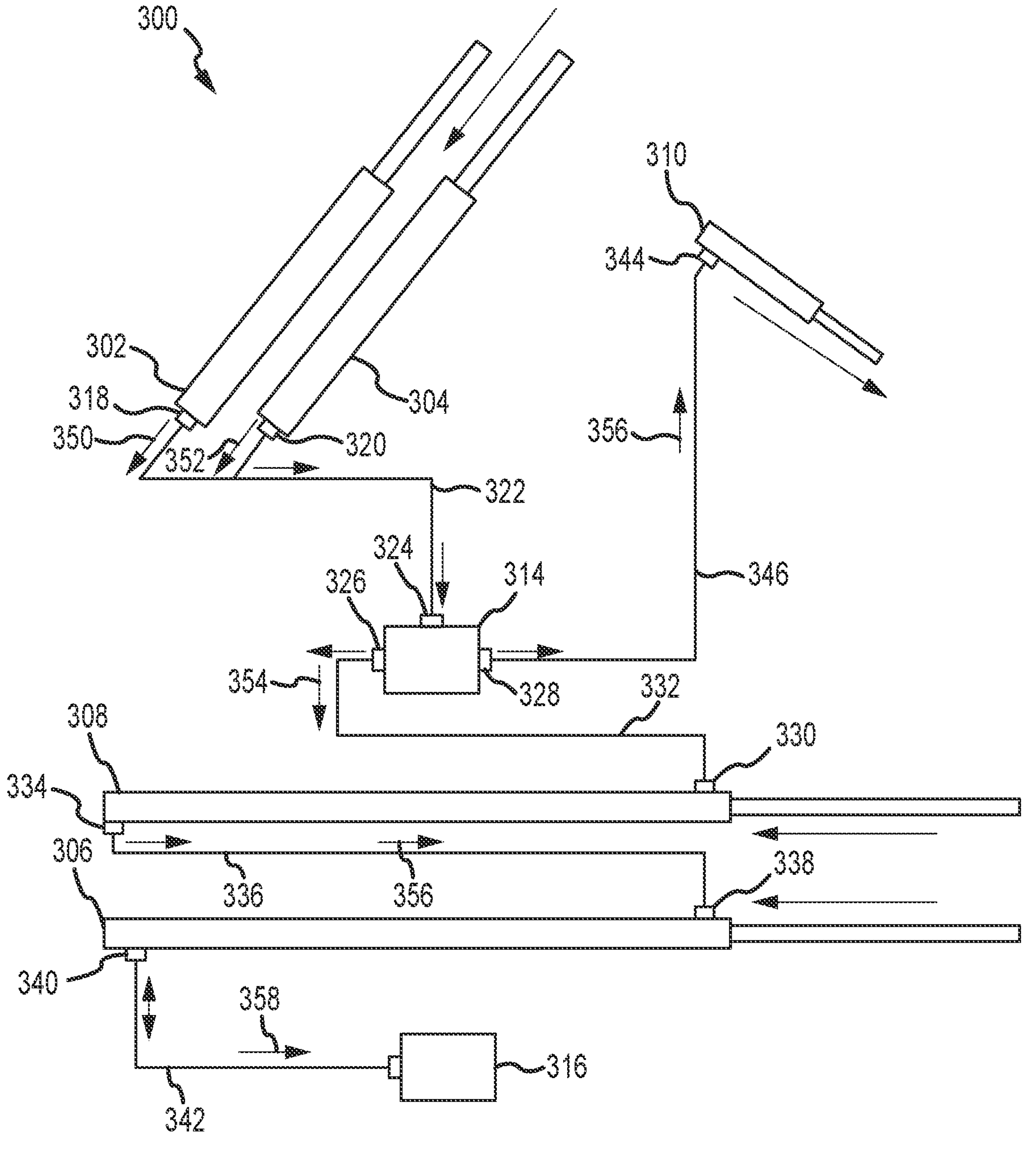
FIG. 3 is a block diagram of an exemplary hydraulic system that may be used with of the construction machine shown in FIGS. 1 and 2, which may be used to control bleed down and retraction of the boom within a predefined safety envelope.

FIG. 3 is a block diagram of a hydraulic system 300 of construction machine 100 (as shown in FIGS. 1 and 2). In various embodiments, hydraulic system 300 may include components, such as one or more hydraulic cylinders or actuators 302-312, as described below, that provide motive forces for raising, lowering, extending, and retracting, as the case may be, boom 118 and/or jib 130 in different ranges of motion.

As described in additional detail below, hydraulic system 300, and more particularly actuators 302-312, may be filled with a hydraulic fluid, such as any suitable high pressure oil. Further, in exemplary embodiments, actuators 302-312 may be fluidly interconnected in different arrangements to uniquely facilitate bleed down and retraction of boom 118 and/or jib 130. As a result, actuators 302-312 may, in at least some embodiments, include modifications, such as bleed valves that can be actuated independent of a primary electrical power system and/or independently by a single operation located in work platform 112, inflow valves, and bypass valves, arranged and adapted to facilitate the bleed down and retraction features described herein. Accordingly, in the exemplary embodiment, hydraulic system 300 includes one or more actuators 302-312, such as, for example, at least a first boom lift actuator 302, a second boom lift actuator 304, a first boom extend actuator 306, a second boom extend actuator 308, a jib leveling actuator 310, and/or a jib articulating actuator 312. In at least some embodiments, actuators 302-312 are hydraulic actuators, such as fluid operated cylinder and piston assemblies. In general terms, a flow of hydraulic fluid may be provided to and/or released from actuators 302-312 to cause extension of actuators 320-312 and/or retraction of actuators 302-312. Further, and as described in additional detail herein, it will be appreciated that the hydraulic pressure within actuators 302-312 can be adjusted to control a position and/or a motion of boom 118.

For example, a flow of hydraulic fluid to first boom lift actuator 302 and/or second boom lift actuator 304 may be controlled to adjust an elevation or vertical movement of boom 118. Because first and second boom lift actuators 302 and 304 include piston and cylinder assemblies, first boom lift actuator 302 and second boom lift actuator 304 may also be referred to as a "first boom lift cylinder" and a "second boom lift cylinder," respectively. In at least some embodiments, first and second boom lift actuators 302-304 may be operated at pre-determined flow rates or fluid pressures to selectively control an angle position and/or elevation of boom 118. Stated another way, control of the elevation and/or angle position of boom 118 also controls the vertical motion of boom 118.

In similar fashion, a flow of hydraulic fluid may be provided to first boom extend actuator 306 and second boom extend actuator 308 to selectively extend and retract boom 118. In other words, first and second boom extend actuators 306-308 may be operated to control telescoping of boom 118. Because first and second boom extend actuators 306 and 308 include piston and cylinder assemblies, first boom extend actuator 306 may be referred to as a "first boom extend cylinder," and second boom extend actuator 308 may be referred to as a "second boom extend cylinder." In at least some embodiments, first and second boom extend actuators 306-308 may be operated at pre-determined hydraulic pressures and/or flow rates to selectively control an extension or retraction position (e.g., a telescoped length) of boom 118.

Further, in at least some embodiments, first boom extend actuator 306 may be positioned or located within construction machine 100 to function as a "primary boom extend cylinder," inasmuch as first boom extend actuator 306 may control extension and retraction of first boom section 124. In like manner, second boom extend actuator 308 may, in at least some embodiments, be positioned or located within construction machine 100 to function as a "secondary boom extend cylinder" that controls extension and retraction of second boom section 126. In other embodiments, first boom extend actuator 306 and second boom extend actuator 308 may be arranged to work in tandem, such that second boom extend actuator 308 may extend only after first boom extend actuator 306 is fully extended, and conversely, such that second boom extend actuator 308 may retract prior to retraction of first boom extend actuator 306.

Further, in at least some embodiments, jib leveling actuator 310 and/or jib articulating actuator 312 may additionally or alternatively control a motion of boom 118 by controlling a position of jib 130 relative to main boom sections 124 and 126. As described herein, a supply of hydraulic fluid may be provided to jib leveling actuator 310 and/or jib articulating actuator 312 to adjust a position (e.g., a level and/or a pivoted or articulated position, respectively) of jib 130. As used herein, jib leveling actuator 310 may also be referred to as a "jib leveling cylinder." Similarly, jib articulating actuator 312 may be referred to as a "jib articulating cylinder."

In the exemplary embodiment, hydraulic system 300 may also include a flow manifold 314 and a main hydraulic fluid tank 316. In various embodiments, flow manifold 314 may include any suitable flow divider, such as any gear-type flow divider, capable of dividing and/or combining various fluid flows. Gear-type flow dividers are generally known and not discussed further herein. In some embodiments, manifold 314 may include any other suitable flow divider and/or flow control manifold for controlling and/or transport hydraulic fluid flows.

In at least some embodiments, first boom lift actuator 302 may include a bleed valve 318, which may include a solenoid that can be actuated by an electrical signal and/or manually, such as by hand. Similarly, second boom lift actuator 304 may include a bleed valve 320, which may also include a solenoid that can be actuated by an electrical signal and/or manually by hand. Bleed valves 318 and 320 may drain hydraulic fluid from actuators 302 and 304, respectively, when they are opened or actuated. A fluid supply line 322, such as a high pressure hydraulic hose or tube, may fluidly couple bleed valves 318 and 320 to an input port 324 if manifold 314.

In the exemplary embodiment, manifold 314 may also include a first output port 326 and a second output port 328. As described in additional detail herein, manifold 314 may receive flows from first boom lift actuator 304 and/or second boom lift actuator 306, whereupon manifold 314 may variously combine and/or redistribute these flows between components fluidly coupled to first output port 326 and/or second output port 328.

For instance, in the exemplary embodiment, second boom extend actuator 308 may include an inflow valve 330, which may be fluidly coupled to first output port 326 of manifold 314 by a fluid supply line 332, such as a hydraulic hose or tube. Second boom extend actuator 308 may also include, at its opposite end, a bypass valve 334, which may be fluidly coupled, via a supply line 336 that includes a hydraulic hose or tube, to an input valve 338 of first boom extend actuator 306. First boom extend actuator 306 may also include a bypass valve 340, which may be fluidly coupled to a supply line 342, such as any suitable hydraulic hose or tubing, and which may couple bypass valve 340 to fluid reservoir 316.

In addition, in at least some embodiments, second output port 328 of manifold 314 may be fluidly coupled to an inflow valve 344 of jib leveling actuator 310, such as by a supply line 346, which as described herein, may include any suitable hydraulic hose or tubing. Although not shown, in some embodiments, jib articulating actuator 312 may also be fluidly coupled, such as via an inflow valve, to outflow port 328 of manifold 314.

Certain additional detail related to the unique construction of actuators 302-312 is provided below in reference to FIGS. 4A-4C. Specifically, the construction of actuators 302-312 is described in association with the internal and external flow mechanisms accomplished by actuators 302-312. However, prior to additional description of actuators 302-312, the hydraulic flows provided within hydraulic system 300 are described.

Accordingly, as shown, in at least some embodiments and in operation, when bleed valve 318 of first boom lift actuator 302 is opened (e.g., by providing an electrical signal to a solenoid thereof and/or by manual activation by the machine operator), a first flow 350 of hydraulic fluid exits first boom lift actuator 302 and travels within supply line 322 to manifold 314. More particularly, first flow 350 may be gravity induced under the weight of boom 118 when bleed valve 318 is opened. Stated another way, opening bleed valve 318 may relieve a hydraulic pressure within first boom lift actuator 302, which may, in turn, permit retraction of a piston within a cylinder, resulting in outflow of the hydraulic fluid via bleed valve 318. As a result, in at least some embodiments, opening bleed valve 318 may cause first flow 350 to be supplied to manifold 314, and boom 118 may be lowered as first boom lift actuator 302 retracts. Thus, opening bleed valve 318 facilitates bleed down (and subsequent retraction, as described in additional detail herein) of boom 118.

Correspondingly, when bleed valve 320 of second boom lift actuator 304 is opened (e.g., by providing an electrical signal to a solenoid thereof and/or by manual activation by the machine operator), a second flow 352 of hydraulic fluid exits second boom lift actuator 304 and travels within supply line 322 to manifold 314. Here as well, second flow 352 may be gravity induced under the weight of boom 118 when bleed valve 320 is opened. Thus, opening bleed valve 320 may relieve a hydraulic pressure within second boom lift actuator 304, which may, in turn, permit retraction of second boom lift actuator 304, resulting in outflow of the hydraulic fluid via bleed valve 320. As a result, second flow 352 may be supplied to manifold 314, and boom 118 may be lowered as second boom lift actuator 304 retracts. Opening bleed valve 320 also therefore facilitates bleed down (and subsequent retraction, as described in additional detail herein) of boom 118.

In the exemplary embodiment, first flow 350 and second flow 352 may be combined within manifold 314 to produce a first combined flow 354 and/or a second combined flow 356. As shown, first combined flow 354 may be provided, via supply line 332, to inflow valve 330 of second boom extend actuator 308, which may result in a hydraulic pressure within second boom extend actuator 308 that causes retraction of second boom extend actuator 308, and, in turn, retraction of boom 118.

At substantially the same time, and in some embodiments, second combined flow 356 may be provided to jib leveling actuator 310 to facilitate leveling of jib 130. This may be advantageous, particularly where an operator is suspended in a work platform 112 at the end of jib 130, to maintain a substantially level or horizontal position of work platform 112 during bleed down and retraction of boom 118.

In addition, as first combined flow 354 causes second boom extend actuator 308 to retract, a piston (see FIG. 4 and description below) within second boom extend actuator 308 may be translated axially until the piston passes, at least partially, bypass valve 334. At this stage, second boom extend actuator 308 may be retracted to a position that permits hydraulic fluid within second boom extend actuator 308 to exit second boom extend actuator 308 via bypass valve 334. The hydraulic fluid exiting bypass valve 334 may thus define a first bypass flow 356 of hydraulic fluid.

In the exemplary embodiment, first bypass flow 356 may continue into first boom extend actuator 306 via inflow valve 338, where the same process may occur. Specifically, first bypass flow 356 may develop additional fluid pressure within first boom extend actuator 306, which may drive a piston of first boom extend actuator 306 axially to cause retraction of first boom extend actuator 306. As first boom extend actuator 306 retracts, boom 118 is further retracted.

In addition, in the same way that first bypass flow 356 is produced by second boom extend actuator 308 when the piston is driven at least partially beyond bypass valve 334, a second bypass flow 358 may result when the piston within first boom extend actuator 306 translates axially beyond bypass valve 340 of first boom extend actuator 306. In this configuration, bypass valve 340 is unobstructed by the piston and open. In the exemplary embodiment, second bypass flow 358 exit bypass valve 340 into fluid reservoir 316, where it may be recycled and reused during subsequent operations of machine 100.

Further, although in the exemplary embodiment, second boom extend actuator 308 is retracted in advance of retracting first boom extend actuator 306, in at least some embodiments, the order may be reversed. Specifically, in at least some embodiments, first boom extend actuator 306 may be retracted prior to retracting second boom extend actuator 308, in which case, first boom extend actuator 306 may receive combined flow 354 from manifold 314.

Accordingly, in the exemplary embodiment, as described above, bleed valves 318 and 320 may be opened on first boom lift actuator 302 and/or second boom lift actuator 304 to enable bleed down (e.g., lowering) of boom 118. The weight of boom 118 may force hydraulic fluid out of actuators 302 and 304 and into manifold 314, where the flows can be combined and redistributed to second boom extend actuator 308.

Specifically, the first combined flow 354 exiting manifold 314 enters actuator 308 via an inflow valve 330 disposed at one end of actuator 308. The incoming flow 354 drives a piston within actuator 308 axially within the cylinder of the actuator 308, causing actuator 308 to retract boom 118. Furthermore, when the piston within actuator 308 translates at least partially beyond bypass valve 334, the combined flow 354 exits actuator 308 via the bypass valve 334 and enters first boom extend actuator 306 via an inflow valve 338 thereof. The inflow drives a piston of actuator 306 as described, and this enables further retraction of boom 118. When the piston of actuator 306 translates beyond bypass valve 340, hydraulic fluid exits actuator 306 and returns to reservoir 316, where it can be reused for subsequent operations of construction machine 100.

Figure 4A:
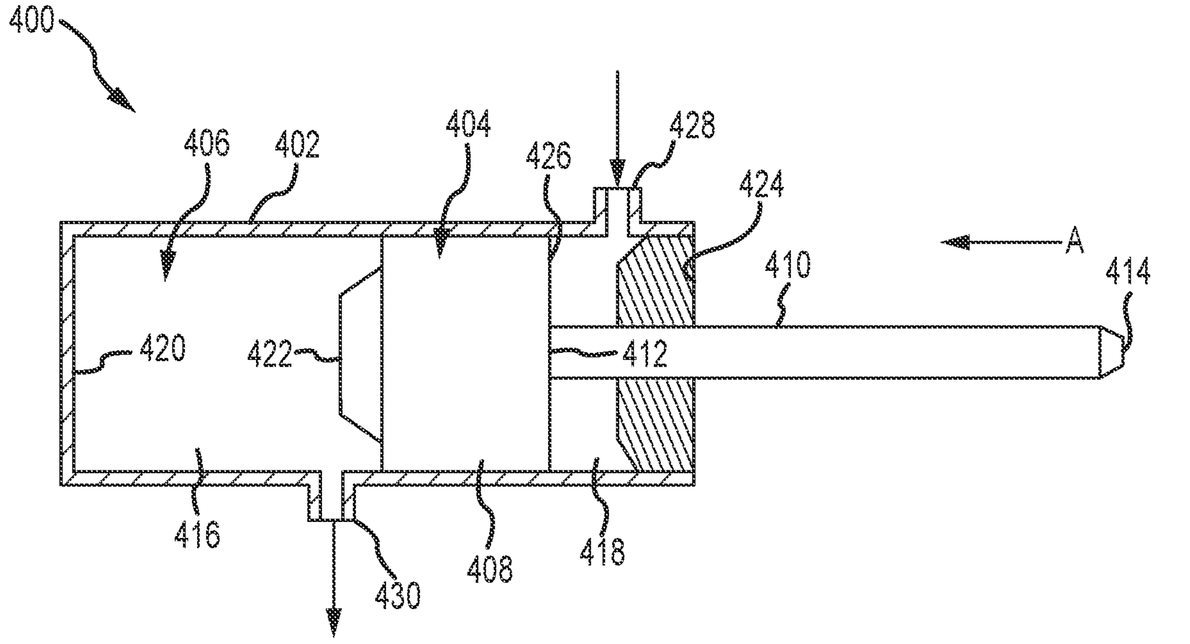
FIG. 4A is a cross-sectional view of an exemplary actuator in an extended position, which may be used with the control system shown in FIG. 3.

FIG. 4A illustrates a cross-sectional view of an exemplary actuator 400 (such as any of first boom extend actuator 306 and/or second boom extend actuator 308) in an extended position. FIG. 4B illustrates a cross-sectional view of actuator 400 in a retracted position. In some embodiments, actuators 302, 304, 310, and/or 312 may be similarly constructed. For instance, in at least some embodiments, jib actuators 310 and/or 312 may be similar to actuator 400, except that jib actuators 310 and/or 312 may exclude a bypass valve 430. Similarly, in at least some embodiments, boom lift actuators 302 and 304 may have the same construction as actuator 400, except that bypass valve 430 may function as a bleed valve having a solenoid (see FIG. 4C), as described herein.

In the exemplary embodiment, actuator 400 includes a cylinder 402 and a piston assembly 404. The cylinder 402 defines a piston chamber 406, within which piston 404 is disposed. Piston 404 includes a piston head 408 and a piston rod 410 mechanically coupled to the piston head 408 at a first end 412 and capable of being mechanically coupled to a portion of boom 118 at a second end 414, as described herein, for variously actuating or controlling a position of boom 118.

Piston chamber 406 is separated by piston assembly 404 into to portions. Specifically, piston chamber 406 includes a first portion 416 and a second portion 418. In at least some embodiments, first portion 416 is defined between a first cylinder wall 420 and a first wall 422 of piston head 408. Similarly, second portion 418 is defined between a second cylinder wall 424 and a second wall 426 of piston head 408. As a result, the volume of first portion 416 and the volume of second portion 418 may change as piston assembly 404 translates axially within piston chamber 406.

In addition, and as described above, in the exemplary embodiment, actuator 400 includes an inflow valve 428 and a bypass valve 430. Here, it will be appreciated that inflow valve 428 may be the same as inflow valves 330 and/or 338, as described with reference to FIG. 3. Likewise, bypass valve 430 may be the same as bypass valves 334 and 340.

Accordingly, in operation, and as described above, a flow of fluid may enter actuator 400 via inflow valve 428. When actuator 400 is in an extended position (as shown in FIG. 4A), the flow of fluid may enter second portion 418 of piston chamber 406. Within second portion 418 of piston chamber 406, the flow of fluid may exert a force against second wall 426 of piston head 408, which may cause piston head 408 to translate axially in the direction labeled "A" (e.g., toward first cylinder wall 420).

As piston head 408 translates axially, piston rod 414 may also translate in the same direction, which may correspondingly enable extension and/or retraction of boom 118. Moreover, as piston head 408 translates axially, at a certain point, piston head 408 may translate beyond bypass valve 430, which may permit fluid flow within second portion 418 of piston chamber 406 between inflow valve 428 and bypass valve 430.

Figure 4B:
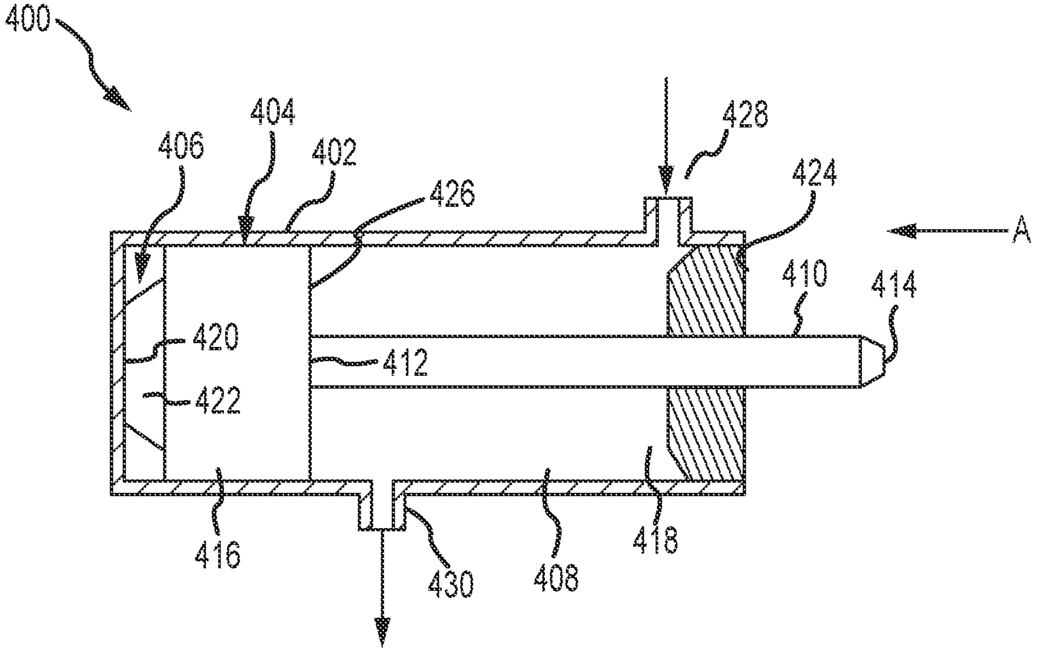
FIG. 4B is a cross-sectional view of the actuator shown in FIG. 4A in a retracted position.

As a result, a fluid pathway may be created between inflow valve 428 and bypass valve 430 when actuator 400 is substantially in the retracted position (as shown in FIG. 4B), such that fluid may "bypass" the actuator 400 on its way to a subsequent actuator in the flow path. In the example of FIG. 3, the flow of fluid bypasses actuator 308 once actuator 308 is in a retracted position and continues to actuator 306.

Figure 4C:
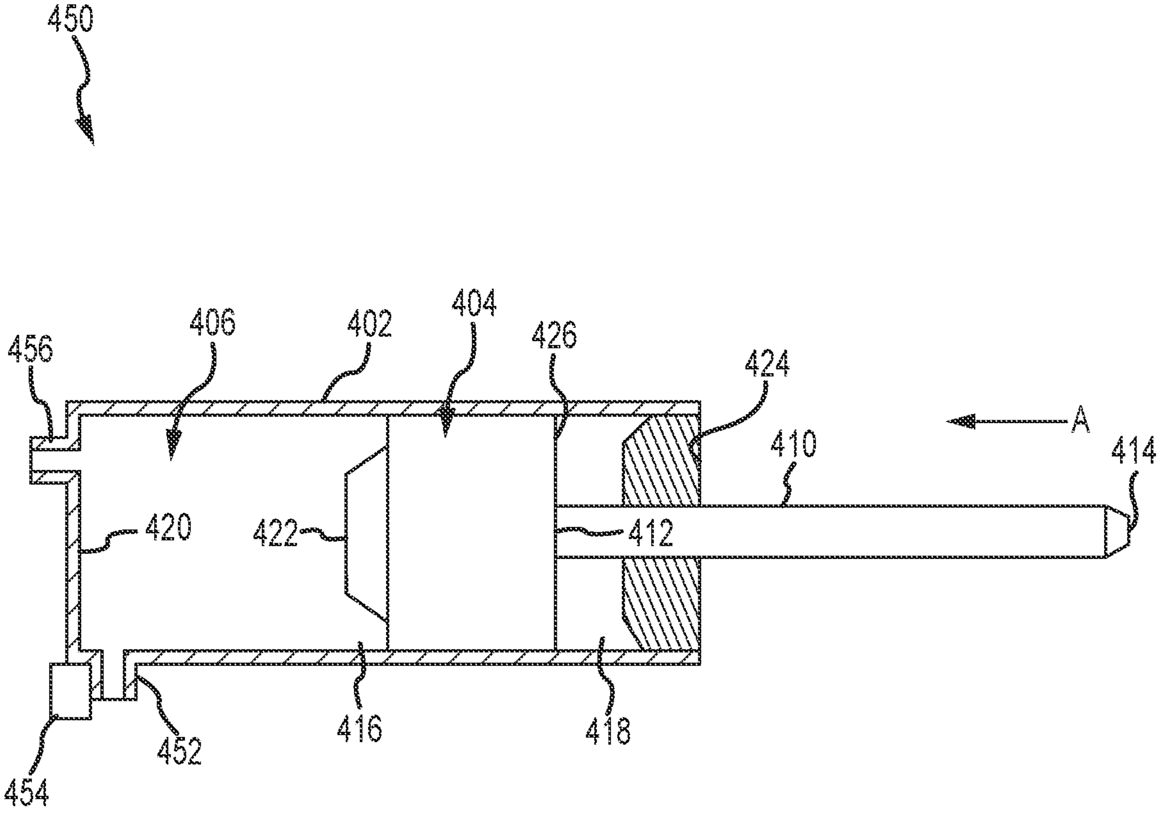
FIG. 4C is a cross-sectional view of another exemplary actuator, which may be used with the control system shown in FIG. 3.

FIG. 4C illustrates a cross-sectional view of an actuator 450, in which actuator 450 is configured as either of first boom lift actuator 302 and/or second boom lift actuator 304. In the exemplary embodiment, actuator 450 is the same as actuator 400, except that actuator 450 may include a bleed valve 452 having a solenoid 454 for controlling opening and closing of bleed valve 452. As shown, bleed valve 452 may be disposed in fluid communication with first portion 416 of piston chamber 406, such that fluid is capable of flowing out of piston chamber 406 when bleed valve 452 is opened.

In at least some embodiments, solenoid 454 may include any suitable solenoid capable of opening and closing bleed valve 452. For example, solenoid 454 may include any electromagnet that can be actuated, such as by providing an electrical signal, to open and close bleed valve 452. Solenoids and solenoid valves are generally known and are not described in additional detail herein.

Furthermore, in the exemplary embodiment, actuator 450 may include at least one inflow valve 456, which may receive a flow of hydraulic fluid for driving or translating piston assembly 404 axially within piston chamber 406, as generally described herein. Although inflow valve 456 is shown fluidly coupled with first portion 416 of piston chamber 406, in other embodiments, inflow valve 456 may be positioned anywhere on actuator 450, such as in fluid communication with second portion 418 of piston chamber 406. Likewise, although inflow valve 456 is illustrated in fluid communication through first cylinder wall 420, inflow valve 456 may also be disposed in fluid communication through any suitable wall of cylinder 402.

Figure 5:
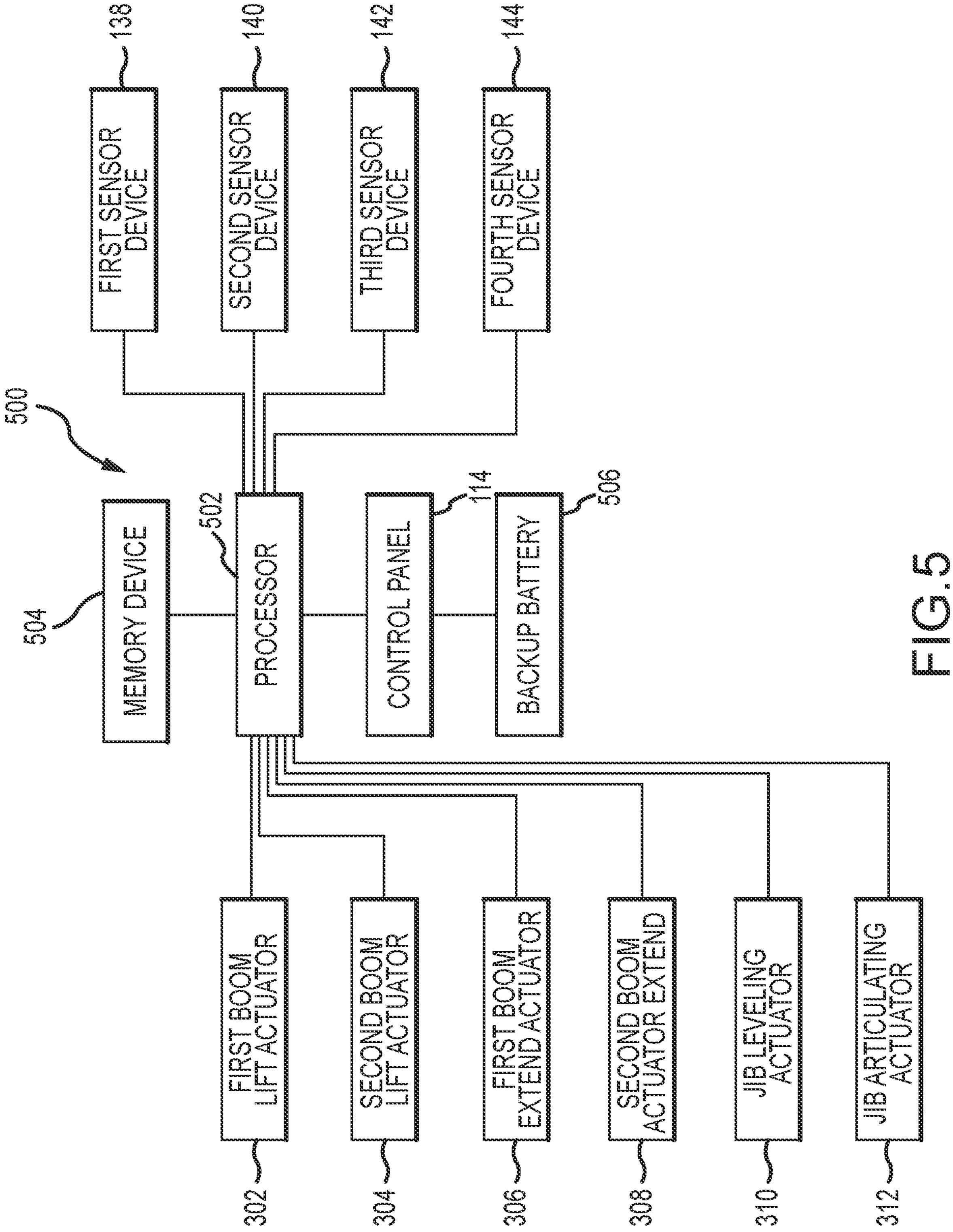
FIG. 5 is a block diagram of an exemplary control system that may be used with the construction machine shown in FIGS. 1 and 2 to control retraction of a boom of the construction machine within a predefined safety envelope.

FIG. 5 is a block diagram of an exemplary control system 500 that may be used with construction machine 100, and which may be used to selectively control bleed down and retraction of boom 118, as described herein. Specifically, control system 500 may be used to selectively control bleed down of boom 118 in response to one or more commands received from input device 114, while maintaining boom 118 within a safety envelope. In the exemplary embodiment, control system 500 may be functional and capable of controlling bleed down operations, even in the circumstance that primary power of construction machine 100 is interrupted and/or in one or more other emergency situations.

In addition to commands received from input device 114, as described herein, control system 500 may also receive commands from an input device (not shown) located substantially at ground level, such as within an operator cab located near ground level (e.g., rather than near work platform 112). Accordingly, in at least some embodiments, control system 500 may be used to selectively control bleed down and retraction of boom 118 in response to one or more commands received from an additional or different input device located near ground level. As a result, an operator or another individual who is not located in work platform 112 may also operate construction machine to control bleed down and retraction of boom 118, such as, for example, if the operator located on work platform 112 becomes incapacitated or is otherwise unable to initiate bleed down and retraction without assistance. Accordingly, in various embodiments, control system 500 may be controlled to initiate bleed down and retraction from input device 114 on work platform 112 and/or from a different input device located closer to and/or accessible from ground level.

As such, in the exemplary embodiment, control system 500 includes a processor 502 communicatively coupled to a memory device 504 that stores instructions which when executed by processor 502 are configured to cause processor 502 to perform the control processes and actions described herein. In some embodiments, memory device 504 may be physically separate from processor 502. Alternatively or additionally, memory device 504 may be included on processor 502, such as, for example, as part of an integrated circuit of processor 502.

In at least some embodiments, memory device 504 may include one or more devices that enable information, such as executable instructions and/or other data, to be stored and retrieved. Moreover, the memory device 504 may include one or more computer readable media, such as, without limitation, dynamic random access memory (DRAM), static random access memory (SRAM), a solid state disk, and/or a hard disk. As described herein, in the exemplary embodiment, memory device 504 may store, without limitation, application source code, application object code, configuration data, additional input events, application states, assertion statements, validation results, and/or any other type of data. Control system 500 may, in some embodiments, also include a communication interface that is coupled to the processor 502 via a system bus, which may also interconnect memory device 504, any of a variety of peripheral devices, such as sensors and/or actuators, and the like.

In the exemplary embodiment, processor 502 may also be communicatively coupled to any of sensor devices 138-144, input device 114, any of actuators 302-310, and/or a backup battery power supply 506. In at least some embodiments, backup battery power supply 506 may include any suitable supply of backup or emergency electrical power, such as, but not limited to, any suitable battery power supply. In some examples, backup battery power supply 506 includes one or more lithium ion batteries, such as one or more such batteries that maintain a charge for a prolonged duration. To facilitate and extend a lifetime of power supply 506, in at least some embodiments, power supply may be enclosed in a protective housing, which may be water and humidity resistant, temperature controlled or insulated, and the like. Further, in some embodiments, power supply 506 may be electrically coupled to a solar array (e.g., a small-sized solar array) which may be provided to generate electrical power sufficient to trickle charge power supply 506 for the maintenance of the charge stored by power supply 506.

Accordingly, in operation, and in at least some embodiments, an operator of construction machine 100 may select an option to initiate bleed down of boom 118 via input device 114. For example, input device 114 may include one or more buttons, switches, or other suitable input options for initiating bleed down. In response to selection of an option to initiate bleed down, input device 114 may provide an electrical signal, via an electrical wire, to a solenoid 454 of a bleed valve 452. In response to receiving the electrical signal, solenoid 454 may control bleed valve 452 to open, which may initiate the bleed down sequence for one or both boom lift actuators 302 and/or 304.

Moreover, when bleed valves 318 and/or 320 are opened, hydraulic fluid may flow out of actuators 302 and/or 304 under the weight of boom 118, and boom 118 may slowly lower toward the ground. As fluid flows 350 and/or 352 leave actuators 302 and/or 304, the fluid flows 350 and/or 352 enter manifold 314, where the flows 350 and/or 352 are combined and redistributed to second boom extend actuator 308.

Specifically, first combined flow 354 exits manifold 314 and enters second boom extend actuator 308 via an inflow valve 330 disposed at one end of actuator 308. The incoming flow 354 forces a piston within actuator 308 to translate axially within the cylinder of actuator 308. As the piston is translated axially by the inflow 354, actuator 308 retracts boom 118. Furthermore, when the piston within actuator 308 translates beyond bypass valve 334, the combined flow 354 exits actuator 308 via the bypass valve 334 and enters first boom extend actuator 306 via an inflow valve 338. The inflow translates a piston of actuator 306 as described, and this enables further retraction of boom 118. When the piston of actuator 306 translates beyond bypass valve 340, hydraulic fluid exits actuator 306 and returns to reservoir 316, where it can be reused for subsequent operations of construction machine 100.

Accordingly, selection by an operator of the boom bleed down option from input device 114 may cause lowering, or bleed down, of boom 118. Likewise, as fluid flows out of the boom lift actuators 302 and 304, through manifold 314, and into boom extend actuators 308 and 306, boom 118 is also retracted. Thus, a boom bleed down option may be selected by an operator of construction machine 100, such as from work platform 112 (which may be disposed at the end of boom 118 or jib 130) to lower and retract boom 118.

These operations may be performed, even if primary power to construction machine 100 is lost or interrupted, and/or in the presence of other failure conditions. In addition, because bleed down may be initiated from work platform 112, an operator stranded in the platform 112 may control bleed down without assistance from another individual, such as a person located at ground level. Rather, construction machine 100 may be controlled to initiate bleed down and retraction operations by a single individual, even if the individual is stranded in the platform when boom 118 is extended and/or raised. Moreover, the presence of backup battery power supply 506 enables bleed down operations, even if primary power is interrupted.

In addition to these features, in at least some embodiments, control system 500 may control bleed down (or lowering of boom 118) and retraction of boom 118 to coordinate lowering and retraction in a way that maintains boom 118 within a safety envelope (e.g., a predefined stable range of motion). For example, control system 500 may receive position data from sensor devices 138-144 to determine a position of boom 118 (e.g., a boom angle, a boom elevation, a boom length, etc.)

In response to determining the position of boom 118, control system 500 may selectively open and close bleed valves 3118 and/or 320 to control a flow rate of fluid flows 350 and/or 352 into manifold, and thus a rate of lowering of boom 118, as well as a rate of retraction of boom 118. Similarly, in at least some embodiments, control system 500 may be coupled to manifold 314 (which may include one or more flow meters, valves, and the like), and control system 500 may operate to control fluid flow rates into actuators 308-312 leaving manifold 314.

As a result, control system 500 may perform a variety of control functions to ensure that any combination of boom height and boom extension position occupied by boom 118 and/or jib 130 during bleed down satisfies predefined safety limits. Stated another way, control system 500 may, for example, increase a rate of fluid flow into actuators 306 and/or 308 if boom 118 is lowering a rate that would cause boom 118 to exit the predefined safety envelope. However, this is only one example scenario. It will be appreciated that any of a wide variety flow control operations may be performed to ensure that boom 118 is kept within the safety envelope.

Furthermore, in at least some embodiments, control system 500 may not be needed to coordinate bleed down operations of boom 118, or control system 500 may function as described below. Accordingly, in some embodiments, bleed down of boom 118 may be conducted entirely via manual operations and/or in the absence of electrical power. For example, in at least one embodiment, bleed valves 318 and/or 320 may be pre-gauged to release hydraulic fluid, during bleed down, at one or more rates that ensure consistent bleed down and retraction of boom 118 within the safety envelope.

Similarly, in at least some embodiments, bleed valves 318 and/or 320 may be fully opened to provide a maximum rate of flow out of first boom lift actuator 302 and/or second boom lift actuator 304 and into second boom extend actuator 308 and/or first boom extend actuator 306. In this scenario, a maximum flow rate out of actuators 302 and 304 may result in a maximum rate of decline of boom 118 as well as a maximum rate of retraction of boom 118, which may function to maintain boom 118 within the safety envelope associated with construction machine 100.

In both cases, bleed valves 318 and 320 may be manually actuated, such as by providing an operator of construction machine 100 control access to bleed valves 318 and 320 from platform 112. Similarly, in at least some exemplary embodiments, bleed valves 318 and 320 may, as described in additional detail herein, be actuated by operator using input device 114, even if primary electrical power is disturbed or interrupted, such as using battery backup power supply 506 to open the solenoids of each bleed valve 318 and 320.

Figure 6:
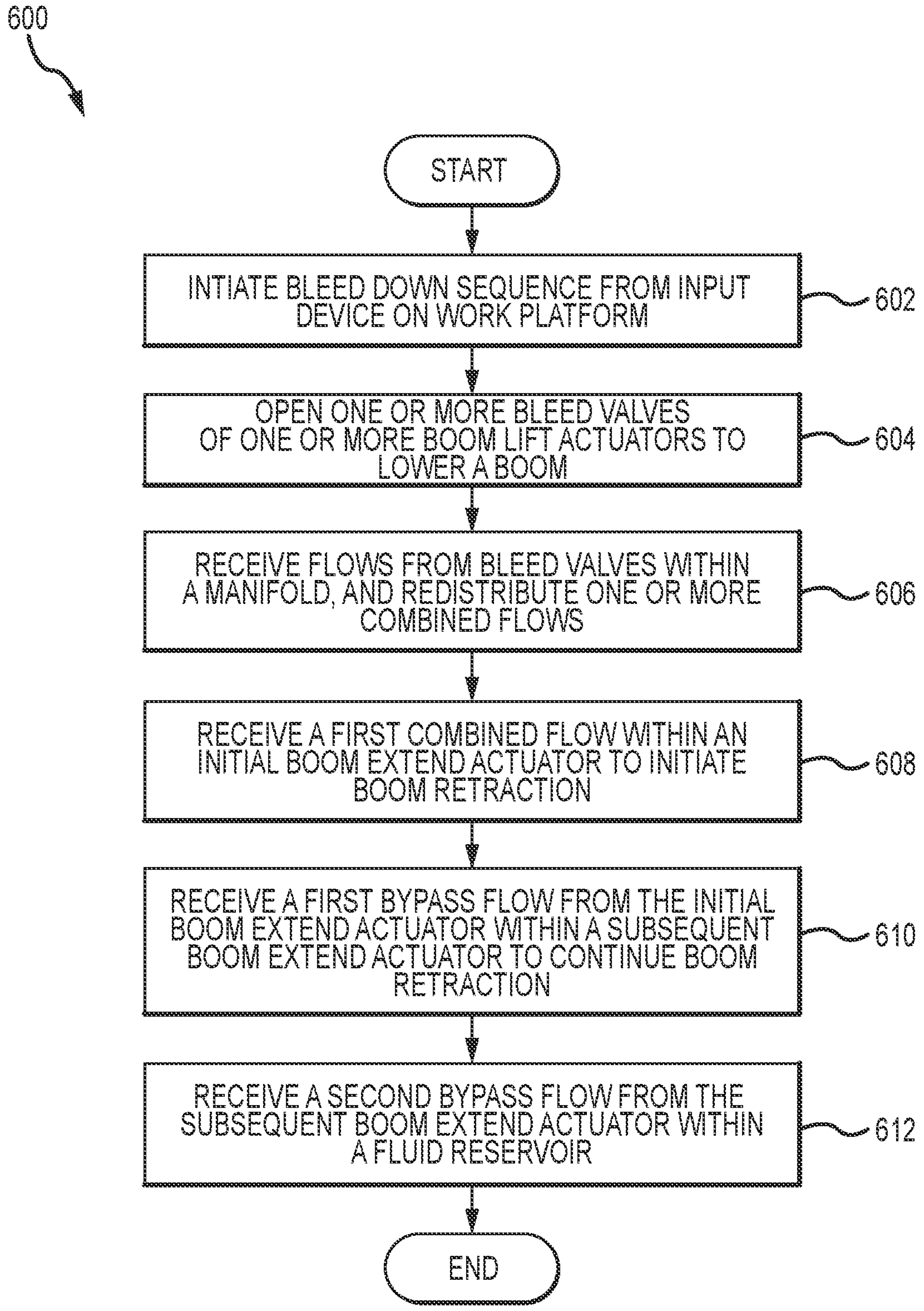
FIG. 6 is a flowchart illustrating an exemplary process for controlling bleed down and retraction of a boom of a construction machine, such as the machines shown in FIGS. 1 and 2.

FIG. 6 is a flowchart illustrating an example process 600 for controlling bleed down and retraction of a boom within a safety envelope. In the exemplary embodiment, bleed down may be initiated from input device 114, as described above, by an operator located at a distal end of boom 118, such as in work platform 112 (step 602). In response to operator initiated bleed down, input device 114 may provide an electrical signal (e.g., a control signal) to solenoid bleed valves 318 and/or 320 of first boom lift actuator 302 and/or second boom lift actuator 304, which may cause bleed valves 318 and/or 320 to be opened (step 604).

When first and/or second bleed valves 318 and/or 320 are opened, boom 118 may begin to bleed down (or lower), and first flow 350 and/or second flow 352 may be received from actuators 302 and/or 304 within manifold 314, which may combine and redistribute the flows 350 and 354 into one or more combined flows, such as first combined flow 354 and/or second combined flow 356 (step 606). In at least some embodiments, second combined flow 356 may be provided to jib leveling actuator 310 and/or jib articulating actuator 312 to facilitate leveling and/or other positioning of jib 130.

In addition, first combined flow 354 may be provided to one of boom extend cylinders 306 and/or 308. In the exemplary embodiment, first combined flow 354 is initially provided to second boom extend actuator 308, causing second boom extend actuator 308 to retract boom 118 (step 608). As second boom extend actuator 308 retracts, bypass valve 334 is opened to fluid flow, such that first bypass flow 356 of hydraulic fluid within second boom extend actuator 308 exits via bypass valve 334 and flows into first boom extend actuator 306 (step 610). Within first boom extend actuator 306, first bypass flow 356 causes first boom extend actuator 306 to further retract boom 118. Finally, as first boom extend actuator 306 retracts, bypass valve 340 is opened to fluid flow, such that second bypass flow 358 of hydraulic fluid within first boom extend actuator 306 exits via bypass valve 340 and flows into fluid reservoir 316 for subsequent recycling and/or reuse within hydraulic system 300 (step 612).

Systems and methods for bleed down and retraction of a construction machine boom are thus described. In the exemplary embodiment, the system may include a backup battery power supply, one or more hydraulic actuators for raising, lowering, extending, and/or retracting the boom, and an input device controllable by an operator of the boom. The backup battery power supply may be provided, such that the operator is able to control bleed down and/or retraction of the boom when primary electrical power is interrupted. Further, the input device may be positioned in a location that is accessible by the operator when the boom is raised and/or extended, such as on a work platform coupled to a distal end of the boom.

Thus, the system receives a control instruction from the operator of the boom that causes the boom to begin a bleed down sequence, even when the operator is located high above the construction machine at the end of a raised and extended boom. Further, the system is provided as a failsafe system of the construction machine, which may be provided alongside and independently of one or more other conventional systems, and which can function even when primary power is interrupted or otherwise lost. Further, the system can be operated by a single, independent, operator positioned in a work platform when the boom is extended.

In addition to these features, the system is capable of maintaining the boom within a safety envelope (e.g., a predefined stable range of motion or predefined stable ranges of boom lengths and extension positions) during bleed down and retraction of the boom. To achieve these advantages, the system channels fluid flow from one or more boom lift actuators (which control boom height) to a fluid manifold, which combines and redistributes these flows to one or more boom extend actuators (which control boom extension and retraction). Thus, in operation, the system is able to simultaneously control bleed down and retraction operations as hydraulic fluid is released from the boom lift actuators, allowing the actuators to lower the boom, and channeled into a piston rod side of the one or more boom extend actuators, forcing retraction of the boom lift actuators and, correspondingly, the boom itself.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hydraulic system for controlling bleed down and retraction of a boom within a safety envelope, the hydraulic system comprising at least:

a backup battery power supply;

at least a first boom lift hydraulic cylinder configured to raise and lower the boom, the first boom lift hydraulic cylinder including a solenoid bleed valve, the solenoid bleed valve electrically connected to the backup battery power supply;

at least a first boom extend hydraulic cylinder configured to extend and retract the boom;

an input device controllable by an operator of the boom from a work platform of the boom, the input device configured selectively actuate the solenoid bleed valve using electrical power supplied from the backup battery power supply; and a manifold fluidly coupled between the first boom lift hydraulic cylinder and the first boom extend hydraulic cylinder, the manifold configured to direct fluid flow between the first boom lift hydraulic cylinder and the first boom extend hydraulic cylinder to maintain the boom within a safety envelope during bleed down and retraction of the boom.

2. The hydraulic system of claim 1, wherein the work platform is coupled to a distal end of the boom, and wherein the solenoid bleed valve is configured to be actuated by an operator of the boom while the boom is at least one of raised or extended.

3. The hydraulic system of claim 1, further comprising a second boom lift hydraulic cylinder configured to raise and lower the boom, the second boom lift hydraulic cylinder including a solenoid bleed valve, the solenoid bleed valve of the second boom lift hydraulic cylinder electrically connected to the backup battery power supply.

4. The hydraulic system of claim 1, wherein the manifold comprises a flow divider, the flow divider configured to i) receive a plurality of inflows of fluid, ii) combine the plurality of inflows of fluid into a combined flow of fluid, and iii) provide the combined flow of fluid to the first boom extend hydraulic cylinder.

5. The hydraulic system of claim 1, wherein the first boom extend hydraulic cylinder is fluidly coupled to the first boom lift hydraulic cylinder, and wherein a first flow of fluid is provided from the first boom lift hydraulic cylinder to the first boom extend hydraulic cylinder when the solenoid bleed valve of the first boom lift hydraulic cylinder is opened.

6. The hydraulic system of claim 5, wherein the first flow of fluid is gravity induced under a weight of the boom, and wherein the first boom extend hydraulic cylinder receives the first flow of fluid to coordinate retraction of the boom within the safety envelope while the boom is simultaneously lowered.

7. The hydraulic system of claim 1, wherein the first boom extend hydraulic cylinder comprises an inflow valve, the inflow valve coupled to the manifold at a first port, the solenoid bleed valve coupled to the manifold at a second port.

8. The hydraulic system of claim 1, wherein the hydraulic system further comprises a second boom extend hydraulic cylinder including an inflow valve fluidly coupled to a bypass valve of the first boom extend hydraulic cylinder, and wherein:

the second boom extend hydraulic cylinder is configured to receive a first bypass flow of fluid from the first boom extend hydraulic cylinder when the first boom extend hydraulic cylinder is fully retracted, and the second boom extend hydraulic cylinder further retracts the boom in response to receiving the first bypass flow of fluid.

9. The hydraulic system of claim 8, wherein the second boom extend hydraulic cylinder further comprises a bypass valve fluidly coupled to a fluid reservoir of the hydraulic system, and wherein the fluid reservoir is configured to receive a second bypass flow of fluid from the second boom extend hydraulic cylinder when the second boom extend hydraulic cylinder is fully retracted.

10. A construction machine comprising:

a boom; and a hydraulic system for controlling bleed down and retraction of the boom, the hydraulic system comprising:
at least a first boom lift actuator configured to raise and lower the boom, the first boom lift actuator including a first bleed valve;
at least a first boom extend actuator configured to extend and retract the boom, the first boom extend actuator including an inflow valve in fluid communication with the bleed valve, the first boom extend actuator configured to receive a first flow of fluid from the first boom lift actuator in response to opening of the bleed valve, wherein when the first flow of fluid is received by the first boom extend actuator, the first boom extend actuator operates to retract the boom; and
a flow manifold fluidly coupled between the first boom lift actuator and the first boom extend actuator, wherein the flow manifold is configured to provide the first flow of fluid from the first boom lift actuator to the first boom extend actuator when the bleed valve is opened.

11. The construction machine of claim 10, wherein the first flow of fluid is gravity induced under a weight of the boom, and wherein the first boom extend actuator receives the first flow of fluid to coordinate retraction of the boom within a predefined boom safety envelope while the boom is simultaneously lowered.

12. The construction machine of claim 10, wherein the flow manifold comprises a flow divider, the flow divider configured to i) receive a plurality of inflows of fluid, ii) combine the plurality of inflows of fluid into a combined flow of fluid, and iii) provide the combined flow of fluid to the first boom extend actuator.

13. The construction machine of claim 10, wherein the hydraulic system further comprises a second boom extend actuator including at least an inflow valve fluidly coupled to a bypass valve of the first boom extend actuator, and wherein:
the second boom extend actuator is configured to receive a first bypass flow of fluid from the first boom extend actuator when the first boom extend actuator is fully retracted, and
the second boom extend actuator further retracts the boom in response to receiving the first bypass flow of fluid.

14. The construction machine of claim 13, wherein the second boom extend actuator further comprises a bypass valve fluidly coupled to a fluid reservoir of the hydraulic system, and wherein the fluid reservoir is configured to receive a second bypass flow of fluid from the second boom extend actuator when the second boom extend actuator is fully retracted.

15. The construction machine of claim 10, wherein the hydraulic system further comprises:
a second boom lift actuator including a bleed valve, the bleed valve of the second boom lift actuator configured to be opened to enable retraction of the second boom lift actuator and lowering of the boom; and
a flow manifold coupled between the first boom lift actuator, the second boom lift actuator, and the first boom extend actuator, the flow manifold configured to provide a combined flow of fluid from the first boom lift actuator and the second boom lift actuator to the first boom extend actuator.

16. The construction machine of claim 10, further comprising:
a work platform extending from the boom, wherein the bleed valve is actuable by an operator of the construction machine from the work platform, whereby the operator of the construction machine is enabled to control bleed down and retraction of the boom from the work platform when the boom is in at least one of a raised position or an extended position.

17. The construction machine of claim 10, further comprising:
a backup battery power supply;
a work platform extending from the boom; and
an input device located on the work platform and electrically connected to the backup battery power supply, wherein the input device is configured to receive electrical power from the backup battery power supply, and wherein the input device is further configured to receive a control instruction from an operator of the construction machine to open the bleed valve.

18. A method for controlling bleed down and retraction of a boom within a safety envelope, the method comprising:
receiving a first flow of fluid within a flow manifold from a first actuator, the first actuator configured to raise and lower the boom, the first flow of fluid received in response to lowering of the boom;
receiving a second flow of fluid within the flow manifold from a second actuator, the second actuator configured to raise and lower the boom, the second flow of fluid received in response to lowering of the boom;
combining the first flow of fluid and the second flow of fluid into a combined flow of fluid; and
selectively providing the combined flow of fluid to a third actuator, the third actuator configured to extend and retract the boom, wherein when the combined flow of fluid is provided to the third actuator, the third actuator retracts the boom within a safety envelope while the boom is being lowered.

* * * * *